United States Patent
Azulai et al.

(10) Patent No.: US 12,249,168 B2
(45) Date of Patent: Mar. 11, 2025

(54) TEXT DETECTION ALGORITHM FOR SEPARATING WORDS DETECTED AS ONE TEXT BOUNDING BOX

(71) Applicant: INTERNATIONAL BUSINESS MACHINES CORPORATION, Armonk, NY (US)

(72) Inventors: Ophir Azulai, Tivon (IL); Udi Barzelay, Haifa (IL); Oshri Pesah Naparstek, Karmiel (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 17/649,406

(22) Filed: Jan. 31, 2022

(65) Prior Publication Data

US 2023/0245481 A1 Aug. 3, 2023

(51) Int. Cl.
| | |
|---|---|
| *G06K 9/00* | (2022.01) |
| *G06T 3/4046* | (2024.01) |
| *G06T 11/60* | (2006.01) |
| *G06V 30/148* | (2022.01) |
| *G06V 30/414* | (2022.01) |

(52) U.S. Cl.
CPC .......... *G06V 30/153* (2022.01); *G06T 3/4046* (2013.01); *G06T 11/60* (2013.01); *G06V 30/414* (2022.01)

(58) Field of Classification Search
CPC ....... G06V 10/82; G06V 30/10; G06V 30/414
See application file for complete search history.

(56) References Cited

U.S. PATENT DOCUMENTS

| 10,127,673 B1* | 11/2018 | Ben Khalifa | G06V 30/414 |
|---|---|---|---|
| 10,679,085 B2 | 6/2020 | Li | |
| 2015/0234812 A1* | 8/2015 | Vukosavljevic | G06F 40/103 |
| | | | 704/2 |
| 2020/0226400 A1* | 7/2020 | Corring | G06V 10/82 |

(Continued)

OTHER PUBLICATIONS

Li, Hui, Peng Wang, and Chunhua Shen. "Towards end-to-end text spotting with convolutional recurrent neural networks." Proceedings of the IEEE international conference on computer vision. 2017. (Year: 2017).*

(Continued)

*Primary Examiner* — Gregory A Morse
*Assistant Examiner* — Owais Iqbal Memon
(74) *Attorney, Agent, or Firm* — Elliot J. Shine

(57) ABSTRACT

A method, computer system, and a computer program product for text detection is provided. The present invention may include training a text detection model. The present invention may include performing text detection on an inputted image using the trained text detection model. The present invention may include determining whether at least one of a plurality of bounding boxes generated using the inputted image has an aspect ratio above a threshold. The present invention may include based upon determining that at least one of the plurality of bounding boxes generated using the inputted image has the aspect ratio above the threshold, upscaling any text within the at least one bounding box and performing text detection on a new image using the trained text detection model. The present invention may include outputting an output image.

20 Claims, 6 Drawing Sheets

(56) References Cited

U.S. PATENT DOCUMENTS

2021/0110189 A1* 4/2021 Huang ................. G06F 18/217
2021/0192201 A1* 6/2021 Nguyen ........... G06V 30/19173
2021/0201064 A1* 7/2021 Chen ...................... G06F 40/30

OTHER PUBLICATIONS

Liu, Juhua, et al. "ASTS: A unified framework for arbitrary shape text spotting." IEEE Transactions on Image Processing 29 (2020): 5924-5936. (Year: 2020).*
Liao, "TextBoxes++: A Single-Shot Oriented Scene Text Detector," arXiv:1801.02765v3 [cs.CV], Apr. 27, 2018, 15 pgs.
Mahto, "Scene Text Detection And Recognition Using EAST And Tesseract," Towards Data Science, [accessed Sep. 29, 2021], 32 pgs., Retrieved from the Internet: <https://towardsdatascience.com/scene-text-detection-and-recognition-using-east-and-tesseract-6f07c249f5de>.
Mell et al., "The NIST Definition of Cloud Computing", National Institute of Standards and Technology, Special Publication 800-145, Sep. 2011, pp. 1-7.
Richardson, "It's All About The Scale—Efficient Text Detection Using Adaptive Scaling," 2020 IEEE, pp. 1833-1842.
Shashidhara, et al., "Word Segmentation for Document Images by Successively Merging Adjacent Character Bounding Boxes by Iterative Dilation," IJCSET, Feb. 2012, pp. 873-876.
Wang, et al., "R-YOLO: A Real-Time Text Detector for Natural Scenes with Arbitrary Rotation," Sensors 2021 MDPI, Jan. 28, 2021, 20 pgs.

* cited by examiner

SHIP LIABILITY Shipper may increase such limitation of liability by declaring a higher value for carriage N OF
@ing paying a supplemental at stated if required tion of liability by declaring a higher value for carriage
and paying a supplemental charge if required

FIG. 3A

SHIPPERS ATTENTION IS DRAWN TO THE NOTICE concerning CARRIERS LIMITATION OF
LIABILITY Shippers increase Way to such limitation of liability By declaring a higher Value for carriage
@ cannage 4 supplemental charge if required tion of liability by declaring a higher value for carriage
and paying a supplemental charge if required

FIG. 3B

TEXT DETECTION ALGORITHM FOR SEPARATING WORDS DETECTED AS ONE TEXT BOUNDING BOX

BACKGROUND

The present invention relates generally to the field of computing, and more particularly to text detection algorithms.

Text lines which are depicted in small font sizes may be detected by text detection algorithms using only one text bounding box, with the text detection model being unable to separate one line of text from another. This may result in missed words (e.g., words appearing in the text lines being overlooked by the text detection algorithm).

SUMMARY

Embodiments of the present invention disclose a method, computer system, and a computer program product for text detection. The present invention may include training a text detection model. The present invention may include performing text detection on an inputted image using the trained text detection model. The present invention may include determining whether at least one of a plurality of bounding boxes generated using the inputted image has an aspect ratio above a threshold. The present invention may include based upon determining that at least one of the plurality of bounding boxes generated using the inputted image has the aspect ratio above the threshold, upscaling any text within the at least one bounding box and performing text detection on a new image using the trained text detection model. The present invention may include outputting an output image.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIGS. 3A and 3B are exemplary illustrations of an original image and a new image, respectively, according to at least one embodiment;

DETAILED DESCRIPTION

Figure 1:
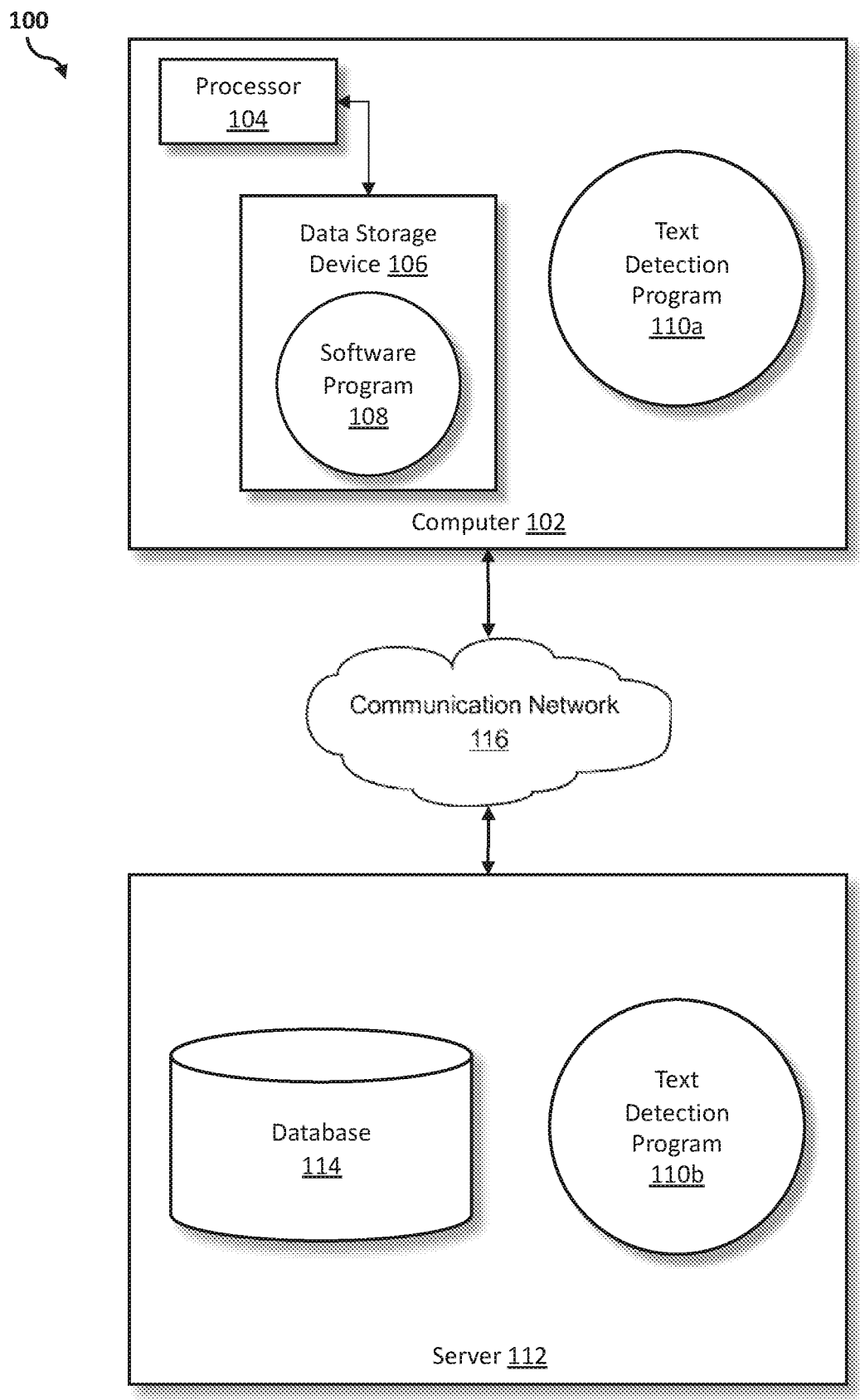
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for text detection. As such, the present embodiment has the capacity to improve the technical field of optical character recognition by performing a second pass at detecting text which may not have been properly detected by first upscaling the mischaracterized or missed text and then running text recognition software again. More specifically, the present invention may include training a text detection model. The present invention may include performing text detection on an inputted image using the trained text detection model. The present invention may include determining whether at least one of a plurality of bounding boxes generated using the inputted image has an aspect ratio above a threshold. The present invention may include based upon determining that at least one of the plurality of bounding boxes generated using the inputted image has the aspect ratio above the threshold, upscaling any text within the at least one bounding box and performing text detection on a new image using the trained text detection model. The present invention may include outputting an output image.

As described previously, text lines which are depicted in small font sizes may be detected by text detection algorithms using only one text bounding box, with the text detection model being unable to separate one line of text from another. This may result in missed words (e.g., words appearing in the text lines being overlooked by the text detection algorithm).

Therefore, it may be advantageous to, among other things, upscale the mischaracterized or missed text and run the text recognition software a second time on that portion of an inputted image.

According to at least one embodiment, the present invention may improve the ability to detect small sized text in an image by creating bounding boxes around each individual word, instead of entire lines of text, so that words may not be missed.

According to at least one embodiment, the present invention may overcome inaccuracies of text detection algorithms, for example, which occur when small font sizes are used. This algorithm may be implemented in Python® (Python and all Python-based trademarks are trademarks or registered trademarks of the Python Software Foundation) or any other high-level general-purpose programming language, as the functionality of the algorithm is not dependent on the use of the Python® language.

According to at least one embodiment, optical character recognition (OCR) may be used to recognize text within a digital image (e.g., a scanned document and/or image). The OCR functionality developed here may function by labeling pixels of a digital image, which labels may be indicative of whether text is present in those pixels. Bounding boxes may then be placed around the pixels labeled with text in order to convert those portions of the digital image into text. If the system determines, based on an analysis of a size of a bounding box, that there is likely more than one word within the generated bounding box, then the text may be upscaled (e.g., made larger) and the analysis repeated until it is determined that the generated bounding boxes contain only one word each. Once this is complete, the image may be converted to text and the text may be returned.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a text detection program 110a. The networked computer environment 100 may also include a server 112 that is enabled to run a text detection program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the text detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the text detection program 110a, 110b (respectively) to solve a problem presented by an inability of text detection algorithms to accurately detect all words in an inputted image by upscaling mischaracterized or missed text and performing a second pass, again using a text detection algorithm, on portions of text which may not have been properly detected. The text detection method is explained in more detail below with respect to FIGS. FIGS. 2, 3A and 3B.

Figure 2:
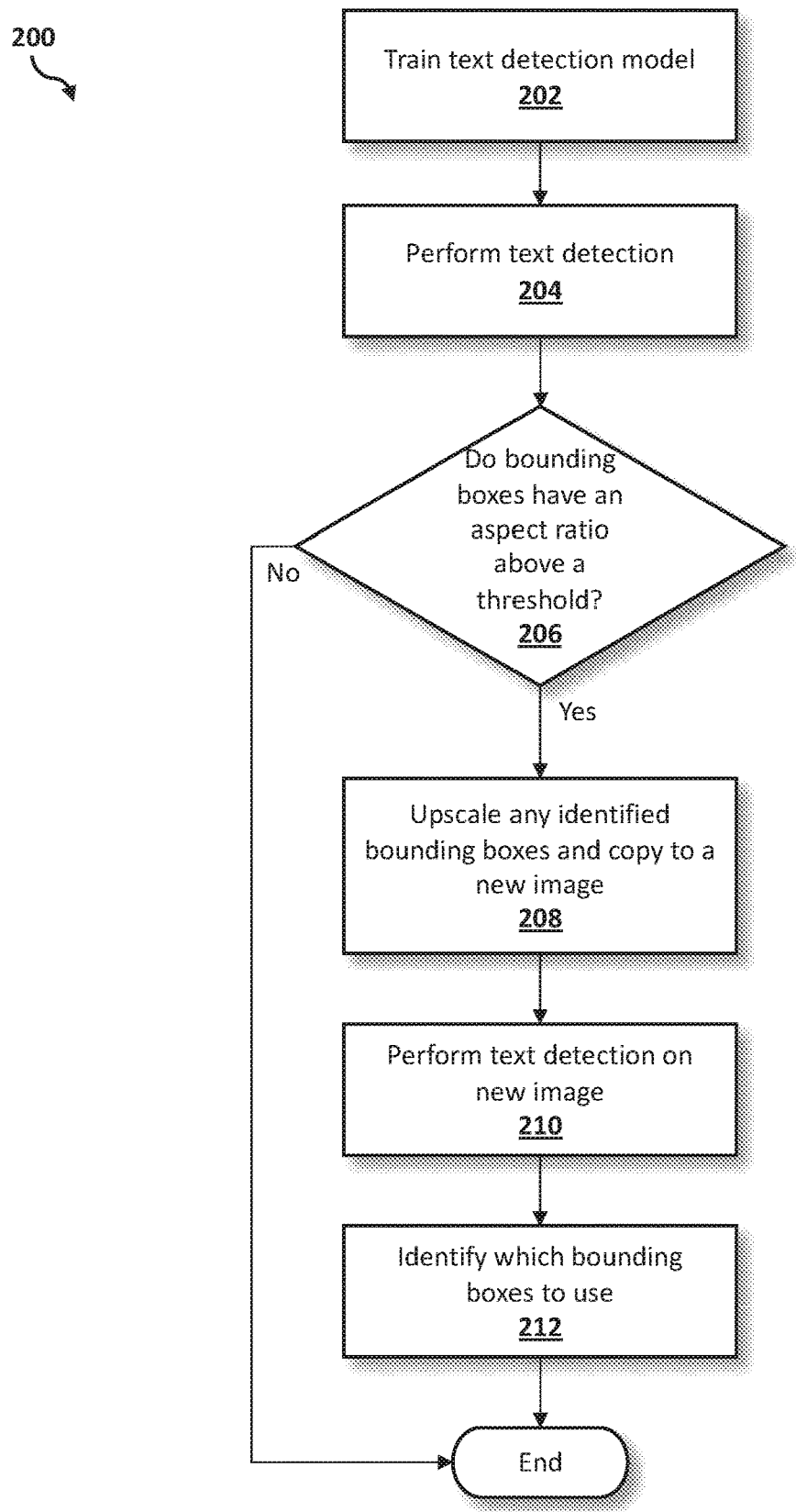
FIG. 2 is an operational flowchart illustrating a process for text detection according to at least one embodiment.

Referring now to FIG. 2, an operational flowchart illustrating the exemplary text detection process 200 used by the text detection program 110a and 110b according to at least one embodiment is depicted.

At 202, a text detection algorithm is trained. A text detection algorithm may utilize a neural network (i.e., a model, a deep learning model) to predict a word or a line of text by showing the neural network text images where each pixel may be labeled as text or not text and the model may accordingly be trained to predict, on future images, whether or not each pixel of the image contains text. Deep learning text detection models may include, but are not limited to including, WordUNet (which performs text detection), among others. Some comprehensive systems may use a version of WordUNet to perform at least a portion of text detection, but may also include additional steps, such as receipt of an image through OCR.

The training of the text detection algorithm may be done by generating text using a generator created to generate random text with variability in size, font, and/or background, which may be injected with additional noise. The training may also include creating bounding boxes around each word and training the neural network, for example, to output every pixel in the image that is in a bounding box with a label of 1 and every pixel in the image that is not in a bounding box with a label of 0.

Bounding boxes may be generated using four corners, however the instant labeling may be done by essentially replacing the pixels in an image with a particular color (e.g., white) where the text detection program 110a, 110b determines that a word is present. In order to determine the presence of letters and words, each character may be surrounded by a Gaussian distribution (e.g., with a normal distribution having the shape of a bell curve) which may depict for the model that the centers of letters are more important than the spaces between the letters (e.g., with the centers of letters producing a more distinct distribution and the spaces between letters, words, or lines not producing any distribution). This may guide the model to learn the actual places of characters inside the words and to not give equal weight to every point inside a bounding box, helping with the overall performance of the model.

As described previously, the text detection program 110a and 110b may apply a Gaussian distribution around a center of each character (e.g., a letter in a word). The neural network may provide as output the resulting Gaussian distributions (e.g., including a Gaussian distribution of each letter and the spaces between the letters). Using the resulting Gaussian distributions, the text detection program 110a and 110b may be trained to determine whether each Gaussian distribution is indicating that a letter is or is not present.

Once the neural network is trained, each time an image is inputted, a resulting image may be generated which includes a label of 'white' in all places where the model believes there is text and a label of 'black' in all places where the model believes there is not, based on a calculated probability as to whether or not each pixel of the image includes text. The model essentially predicts, for each pixel in an image, whether there is text or not. A second algorithm called connected components may then be used to combine the white regions into bounding boxes. The connected components algorithm may be used to place bounding boxes around the text detected in the image. The bounding box may start from a single white pixel and may spread out until a black pixel is reached (e.g., the connected components algorithm may place bounding boxes using the boundaries of a white portion of the image).

At 204, text detection is performed. The text utilized by the text detection program 110a, 110b may be uploaded by a user. The text may be a portion of a document or a full document. Whether a full document or a portion of a document is uploaded does not matter, as the text detection program 110a, 110b may detect text in any image that is uploaded.

As described previously with respect to step 202 above, once the model is trained, text detection may be performed using WordUNet, meaning that an image may be inputted and a probability of each pixel of the image including text may be outputted. A threshold may be applied to generate a resulting binary image of black and white pixels which represent 'yes' or 'no,' indicative of whether text is present or not present, respectively, in those pixels. The connected components algorithm may then be used to place bounding boxes around each word of text detected in the image.

At 206, text bounding boxes are identified which have an aspect ratio or box height (i.e., bounding box height) divided by box width (i.e., bounding box width) above a predetermined threshold (e.g., Otsu threshold). For example, if there is a bounding box which is very wide, the text detection program 110a, 110b may seek to determine whether there is more than one word within the text bounding box. Similarly, if a line is detected instead of a word, then the aspect ratio may be more than a single word's aspect ratio. An image may always have a constant resolution (e.g., 600/800), regardless of how the image may be resized on a screen, and the bounding boxes may also be created in the same resolution. An image resolution may assist in determining whether a bounding box is above the predetermined threshold.

The determination may be based on a ratio of box height divided by box width (e.g., the threshold). For example, lines of text may be very wide (e.g., the box width) but the box height may always be the same (e.g., the height of the text). For example, a threshold may be the ratio of box height divided by box width, calculated for the longest word in the dictionary and multiplied by two. If there is detected text which has a ratio which is above this threshold, then it may be unlikely that the detected text is merely one word. According to at least one alternate embodiment, the threshold may be modifiable as necessary.

At 208, the identified text bounding boxes are upscaled and copied to a new image. If, at 206, the detected text is determined to have an aspect ratio or box height divided by box width above the predetermined threshold, then this portion of the image may be upscaled (e.g., made larger). For the portion(s) of text that are determined to be above the threshold, a larger text size may improve the algorithm's ability to detect individual words.

The upscaling may be done by utilizing a standard image resizing algorithm (e.g., bilinear interpolation) to upscale the image to meet the range where text detection may work better. As described previously, this may be relevant in instances where the text detection algorithm may not detect small sized text. An upscaled portion of the original image may then be copied to a new image (e.g., created in the same file format as the original inputted image) to be run through the text detection algorithm a second time.

At 210, text detection is performed on the new image. Once the text is upscaled, text detection is performed again using WordUNet. The text detection performed here may be the same as was described with respect to step 204 above, with the portion of text being detected being only that which was upscaled, as described previously with respect to step 208 above.

At 212, the text detection program 110a, 110b determines which text bounding boxes to use. If, after upscaling a portion of the image, the text detection algorithm generates many more bounding boxes as compared to what was generated for the original image, then the text detection program 110a, 110b may determine that the bounding boxes generated from the upscaled image are the correct ones and may include these bounding boxes with a final outputted image. The rationale here is that after upscaling the small image, bounding boxes there may be bounding boxes which may no longer be recognized as text and which may be filtered out at this stage, thereby improving the speed and/or efficiency of the computing system by avoiding attempting to convert mischaracterized portions of the image.

Ultimately, the text detection program 110a, 110b may combine both the bounding boxes generated from the original image and the bounding boxes generated from the upscaled portions of the image in a final outputted image.

Referring now to FIGS. 3A and 3B, exemplary illustrations of an original image and a new image, respectively, are depicted according to at least one embodiment. The lines of text depicted by the original image 3A and the new image 3B have been run through different text detection algorithms, with the text detection algorithm utilized in original image 3A most closely mirroring the state of the art prior to the present invention. As can be seen in the original image 3A, each individual word is not surrounded by a bounding box, but instead full lines of text are detected within large bounding boxes. Conversely, the new image 3B depicts an exemplary output of the present invention, with most words being individually detected and surrounded by individual bounding boxes. This may increase the efficiency of the text detection algorithm and improve the quality of the text detection results.

It may be appreciated that FIGS. 2, 3A and 3B provide only an illustration of one embodiment and do not imply any limitations with regard to how different embodiments may be implemented. Many modifications to the depicted embodiment(s) may be made based on design and implementation requirements.

Figure 4:
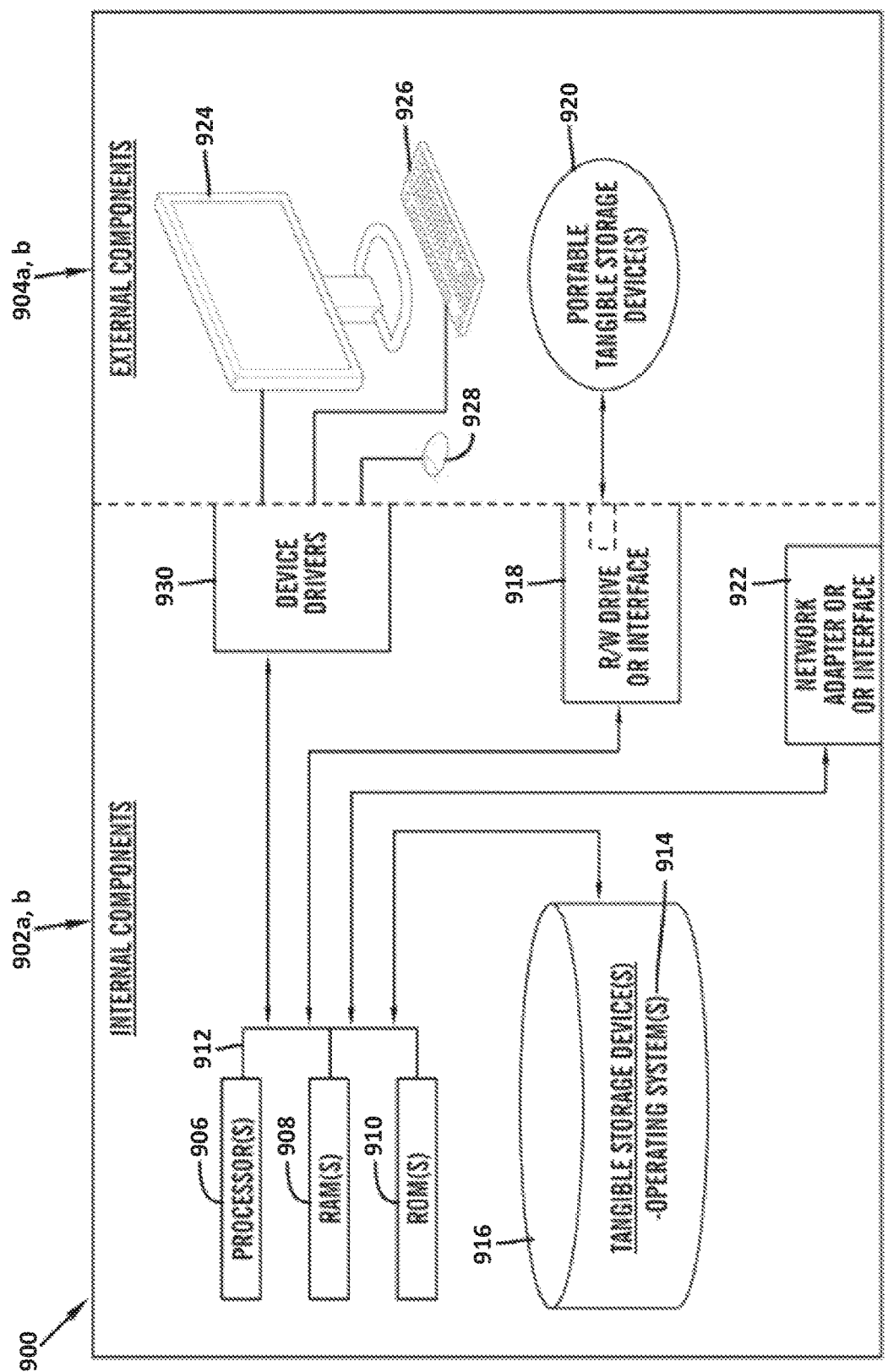
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the text detection program 110a in client computer 102, and the text detection program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the text detection program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the text detection program 110a in client computer 102 and the text detection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the text detection program 110a in client computer 102 and the text detection program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
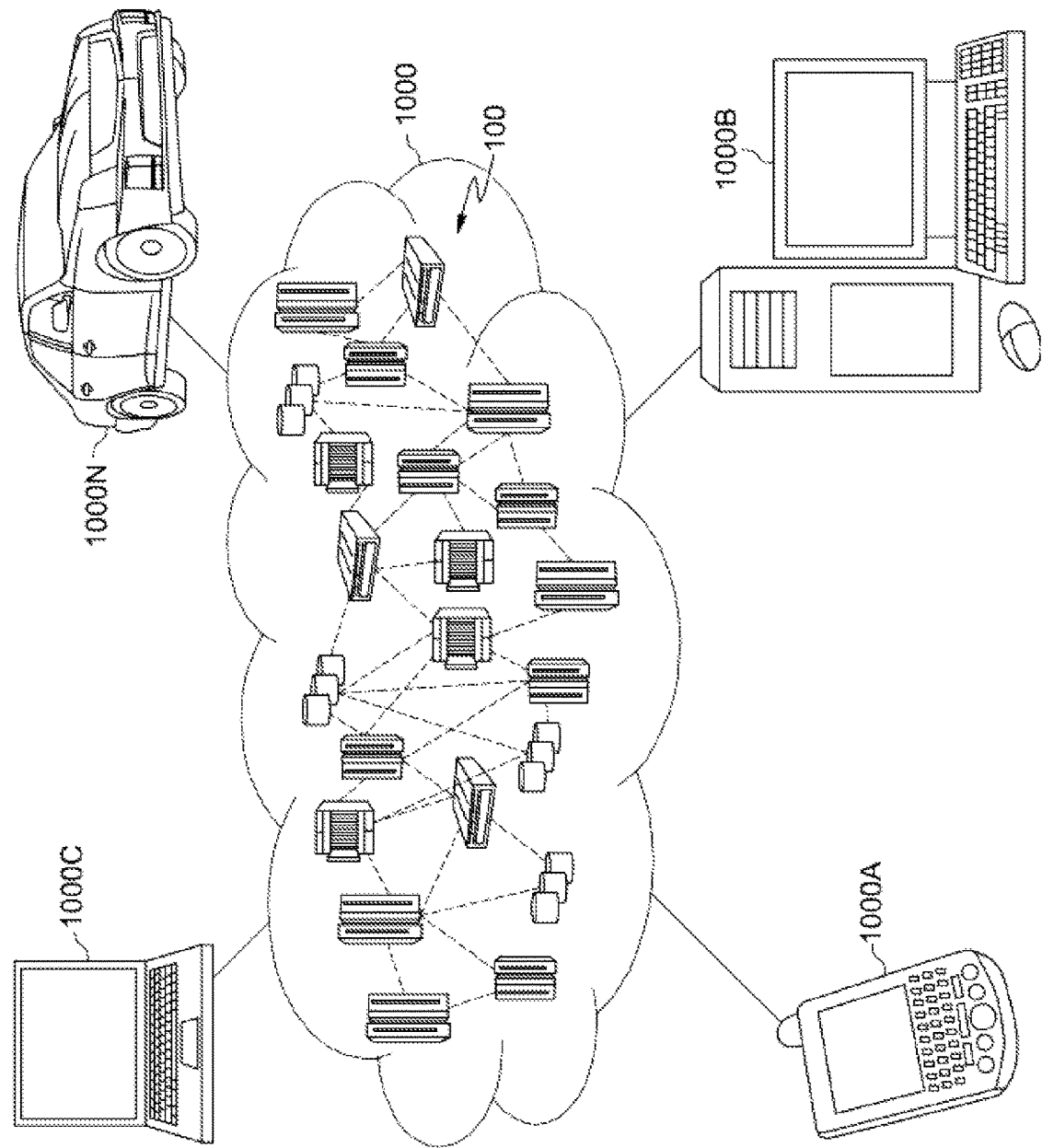
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
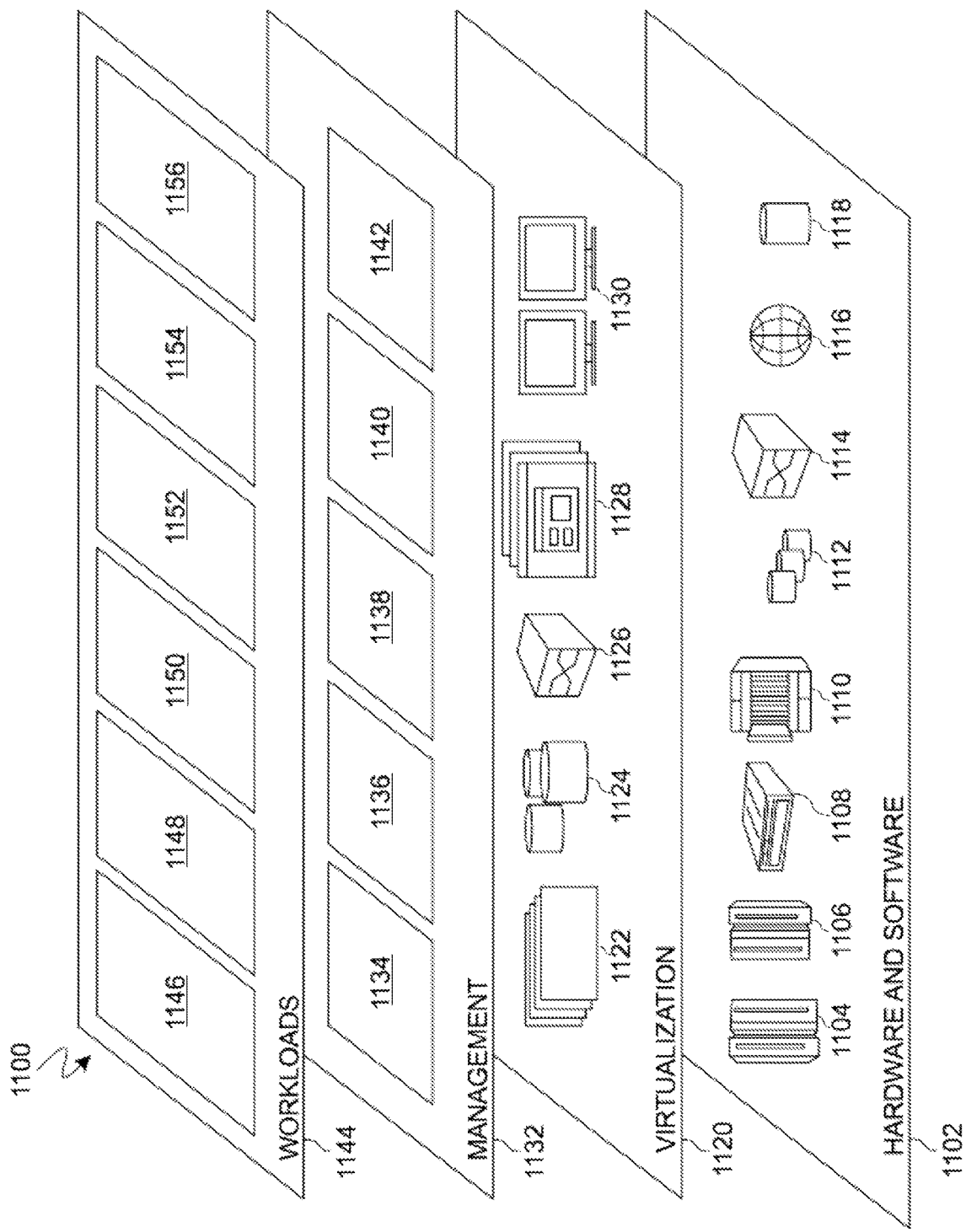
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and text detection 1156. A text detection program 110a, 110b provides a way to solve a problem presented by an inability of text detection algorithms to accurately detect all words in an inputted image by upscaling mischaracterized or missed text and performing a second pass, again using a text detection algorithm, on portions of text which may not have been properly detected.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for text detection, the method comprising:
   training a text detection model, wherein the training comprises generating text using a generator created to generate random text with variability in size, font, and/or background, injected with additional noise;
   performing text detection on an inputted image using the trained text detection model;
   determining whether at least one of a plurality of bounding boxes generated using the inputted image has an aspect ratio above a threshold;
   based upon determining that at least one of the plurality of bounding boxes generated using the inputted image has the aspect ratio above the threshold, upscaling any text within the at least one bounding box;
   copying the at least one of the plurality of generated bounding boxes having the aspect ratio above the threshold to a new image file having a same file format as the inputted image;
   performing text detection on a new image using the trained text detection model;
   combining both the plurality of bounding boxes generated using the inputted image and the new image file, wherein upon determining that at least one of the plurality of bounding boxes generated using the inputted image contains more than one word, replacing any corresponding portions of the inputted image with the at least one bounding box generated using the new image; and outputting an output image, wherein the output image is comprised of at least one bounding box generated using the inputted image and at least one bounding box generated using the new image.

2. The method of claim 1, wherein the trained text detection model is a neural network which predicts a word or a line of text by labeling each pixel in the inputted image as text or not text and placing one of the plurality of bounding boxes generated using the inputted image around a group of concurrent pixels labeled as text using a connected components algorithm, and wherein a Gaussian distribution is calculated based on the group of concurrent pixels labeled as text within the bounding box.

3. The method of claim 1, wherein the threshold is two times a height of a bounding box divided by a width of a bounding box, calculated for a longest word in a dictionary and multiplied by two.

4. The method of claim 1, wherein upscaling the text within the at least one bounding box further comprises:
copying the upscaled text to the new image, wherein the new image is at a constant resolution.

5. A computer system for text detection, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
training a text detection model, wherein the training comprises generating text using a generator created to generate random text with variability in size, font, and/or background, injected with additional noise;
performing text detection on an inputted image using the trained text detection model;
determining whether at least one of a plurality of bounding boxes generated using the inputted image has an aspect ratio above a threshold;
based upon determining that at least one of the plurality of bounding boxes generated using the inputted image has the aspect ratio above the threshold, upscaling any text within the at least one bounding box;
copying the at least one of the plurality of generated bounding boxes having the aspect ratio above the threshold to a new image file having a same file format as the inputted image;
performing text detection on a new image using the trained text detection model;
combining both the plurality of bounding boxes generated using the inputted image and the new image file, wherein upon determining that at least one of the plurality of bounding boxes generated using the inputted image contains more than one word, replacing any corresponding portions of the inputted image with the at least one bounding box generated using the new image; and
outputting an output image, wherein the output image is comprised of at least one bounding box generated using the inputted image and at least one bounding box generated using the new image.

6. The computer system of claim 5, wherein the trained text detection model is a neural network which predicts a word or a line of text by labeling each pixel in the inputted image as text or not text and placing one of the plurality of bounding boxes generated using the inputted image around a group of concurrent pixels labeled as text using a connected components algorithm, and wherein a Gaussian distribution is calculated based on the group of concurrent pixels labeled as text within the bounding box.

7. The computer system of claim 5, wherein the threshold is two times a height of a bounding box divided by a width of a bounding box, calculated for a longest word in a dictionary and multiplied by two.

8. The computer system of claim 5, wherein upscaling the text within the at least one bounding box further comprises:
copying the upscaled text to the new image, wherein the new image is at a constant resolution.

9. A computer program product for text detection, comprising:
one or more non-transitory computer-readable storage media and program instructions stored on at least one of the one or more tangible storage media, the program instructions executable by a processor to cause the processor to perform a method comprising:
training a text detection model, wherein the training comprises generating text using a generator created to generate random text with variability in size, font, and/or background, injected with additional noise;
performing text detection on an inputted image using the trained text detection model;
determining whether at least one of a plurality of bounding boxes generated using the inputted image has an aspect ratio above a threshold;
based upon determining that at least one of the plurality of bounding boxes generated using the inputted image has the aspect ratio above the threshold, upscaling any text within the at least one bounding box;
copying the at least one of the plurality of generated bounding boxes having the aspect ratio above the threshold to a new image file having a same file format as the inputted image;
performing text detection on a new image using the trained text detection model;
combining both the plurality of bounding boxes generated using the inputted image and the new image file, wherein upon determining that at least one of the plurality of bounding boxes generated using the inputted image contains more than one word, replacing any corresponding portions of the inputted image with the at least one bounding box generated using the new image; and
outputting an output image, wherein the output image is comprised of at least one bounding box generated using the inputted image and at least one bounding box generated using the new image.

10. The computer program product of claim 9, wherein the trained text detection model is a neural network which predicts a word or a line of text by labeling each pixel in the inputted image as text or not text and placing one of the plurality of bounding boxes generated using the inputted image around a group of concurrent pixels labeled as text using a connected components algorithm, and wherein a Gaussian distribution is calculated based on the group of concurrent pixels labeled as text within the bounding box.

11. The computer program product of claim 9, wherein the threshold is two times a height of a bounding box divided by a width of a bounding box, calculated for a longest word in a dictionary and multiplied by two.

12. The computer program product of claim 9, wherein upscaling the text within the at least one bounding box further comprises:
   copying the upscaled text to the new image, wherein the new image is at a constant resolution.

13. The method of claim 1, further comprising:
   filtering out at least one of the plurality of plurality of bounding boxes generated using the new image file based on the at least of the plurality of bounding boxes no longer being recognized as text by the trained detection model.

14. The method of claim 1, wherein the training of the text detection model further comprises:
   outputting each pixel of the inputted image within the plurality of bounding boxes with a label of 1 and every other pixel in the inputted image not in the plurality of bounding boxes with a label of 0.

15. The method of claim 1, wherein the performing of the text detection on the inputted image further comprises:
   replacing each pixel of the inputted image with a particular color based on a determination of whether a word is present.

16. The method of claim 15, further comprising:
   combining each pixel with the particular color into the plurality of bounding boxes using a connected components algorithm.

17. The computer system of claim 5, further comprising:
   filtering out at least one of the plurality of plurality of bounding boxes generated using the new image file based on the at least of the plurality of bounding boxes no longer being recognized as text by the trained detection model.

18. The computer system of claim 5, wherein the training of the text detection model further comprises:
   outputting each pixel of the inputted image within the plurality of bounding boxes with a label of 1 and every other pixel in the inputted image not in the plurality of bounding boxes with a label of 0.

19. The computer system of claim 5, wherein the performing of the text detection on the inputted image further comprises:
   replacing each pixel of the inputted image with a particular color based on a determination of whether a word is present.

20. The computer system of claim 19, further comprising:
   filtering out at least one of the plurality of plurality of bounding boxes generated using the new image file based on the at least of the plurality of bounding boxes no longer being recognized as text by the trained detection model.

* * * * *